Patented Aug. 25, 1936

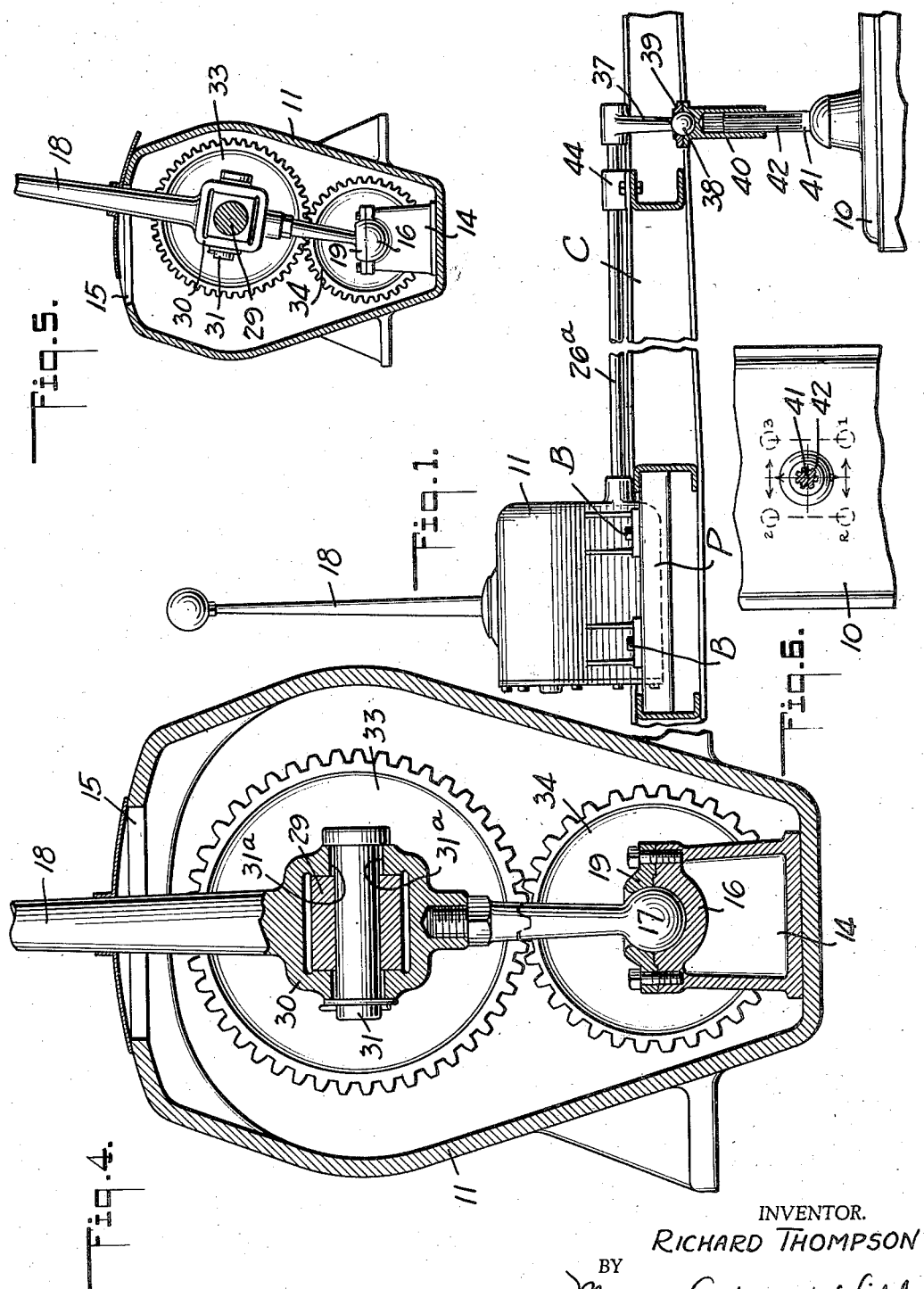

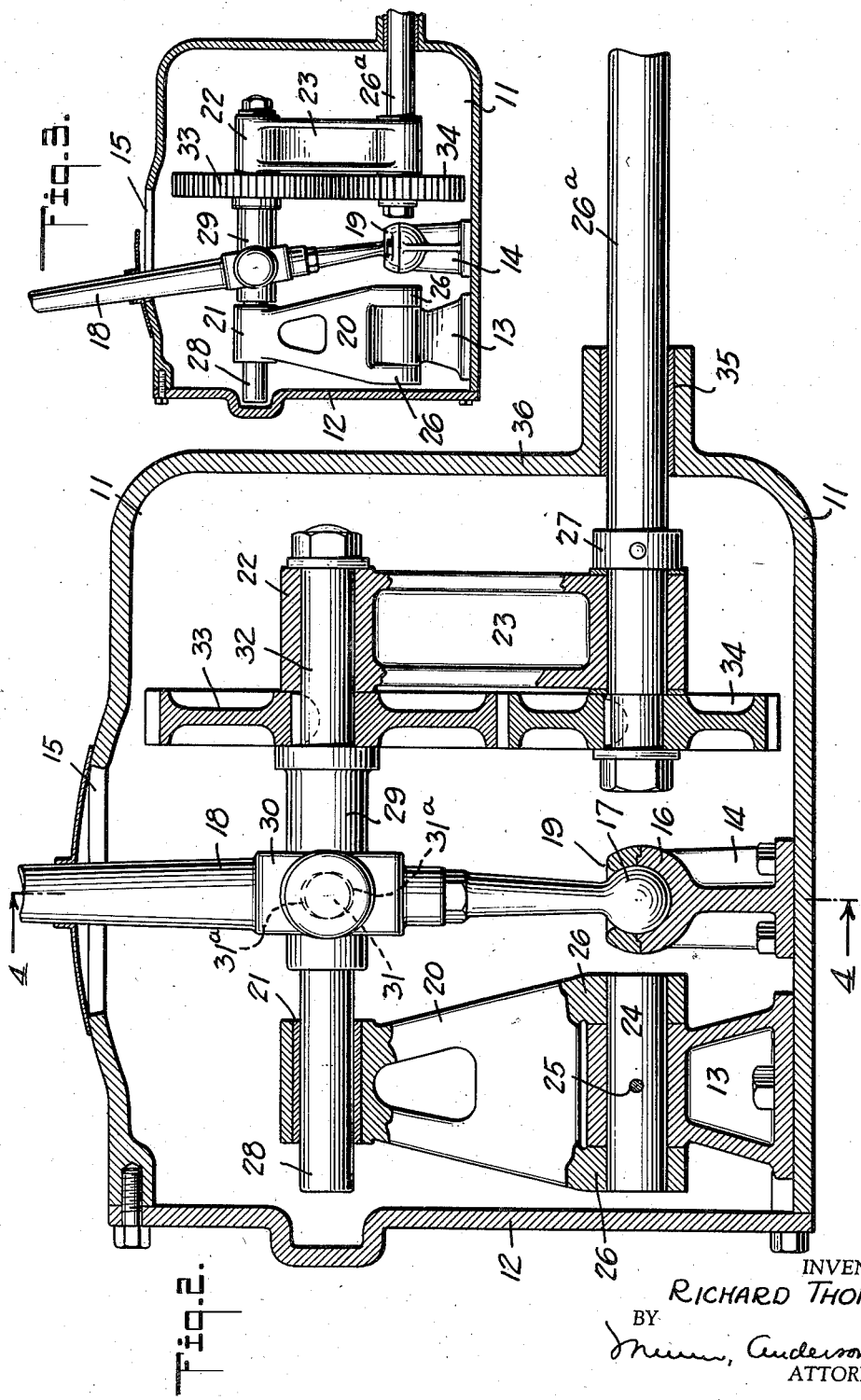

2,052,042

UNITED STATES PATENT OFFICE 2,052,042

GEAR SHIFT MECHANISM

Richard Thompson, Los Angeles, Calif.

Application March 8, 1935, Serial No. 10,110

2 Claims. (Cl. 74—473)

This invention relates to gear shift mechanism for the transmission unit of power plants.

The invention is more especially designed for use in conjunction with automotive vehicles in which the power plant is situated at the rear of the chassis, and an object is to provide mechanism embodying a novel shifting lever selector by means of which the shifting fork of the transmission can be actuated by a shifting lever at the selector, the movements of which, when shifting gears, will correspond exactly with the movements of the shifting lever of a standard shift in which the power plant is at the front of the vehicle.

The invention is more particularly designed for use in connection with a power plant in which the entire power unit as well as the transmission can yield vertically relative to the body, said power plant being more or less wholly suspended by the rear axle, and an important feature of the invention is directed to the provision of means whereby the vertical shifting fork assembly will be connected with the slide shaft of the selector lever so as to automatically compensate itself to all vertical movements of the power plant relative to said body.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

In the drawings:

Figure 1 is a view partly in side elevation and partly in section showing the invention applied to the chassis of an automotive vehicle;

Figure 2 is a vertical section through the selector assembly showing the shifting lever in a neutral position;

Figure 3 is a view somewhat similar to Figure 2, with the shifting lever in a position such as it would occupy when shifted either into first or third gear;

Figure 4 is a vertical transverse section taken on the line 4—4 of Figure 2, with the lever in neutral position;

Figure 5 is a view similar to Figure 4, with the lever shifted laterally preparatory to moving same either into second or third gear; and Figure 6 is a transverse section through the shifting fork stem.

In carrying the invention into practice, use is made of a conventional selective type of transmission 10, adapted to be directly coupled to a power plant, not shown. A power plant mounting designed to support both the power plant and said transmission, and to be used in conjunction with the herein described invention, is disclosed in my co-pending application No. 10,109, executed of even date herewith.

The lever selector assembly employed herein consists of a case 11 having a removable head 12 at one end and fixedly mounted in said case are brackets 13 and 14, the latter disposed in vertical alinement with an opening 15 in the top wall of the case. Said bracket 14 is provided with a socket 16 in which the ball 17 at the lower end of a shifting or selecting lever 18 is mounted and retained by a clamp ring 19, whereby said lever can be moved laterally to the left or to the right from a neutral position shown in Figures 2 and 6, or forwardly or rearwardly for operative control of the customary shifting forks (not shown) of transmission 10. It thus follows that the operation of the lever in no manner departs from the customary operation of a standard gear shift in which the speed changes are effected as follows: from "neutral" position in full lines, Figure 6, to the left, then rearwardly to first or low speed, thence forwardly and laterally and forwardly to second speed, thence rearwardly to high or third speed, reverse speed being had in the manner common to the use of the well known H-shaped selector gate.

In the bracket 13 is mounted an oscillative means or bearing arm 20 having a bearing sleeve 21, the latter disposed in alinement with a bearing 22 at the upper end of an oscillative means or arm 23. A bearing pin 24 is keyed at 25 to bracket 13 and journaled on the ends thereof are the hinge knuckles 26 at the lower end of said arm 20. The lower end of arm 23 is journaled upon a combined slide and oscillative shaft 26ᵃ at one side of a stop collar 27 on said shaft.

Mounted to slide in the bearing 21 of oscillating arm 20 is one end of a stub shaft 28, the same having an intermediate portion 29 which passes through the box 30 of the shifting lever 18 and is pivoted thereto by the pin 31, there being clearance 31ᵃ provided between the pin and the opposite walls of the box, to enable the lever 18 to freely function on the bracket 14. Fixed to the spindle 32 of aforementioned shaft 28 is a large gear 33 which is maintained in constant mesh with a gear 34 by reason of the fact that arm 23 from shaft 26ᵃ is tied to the spindle 32, whereby the required oscillatory motion will be imparted to the shaft 26a during lateral adjustment of the lever 18 either to the right or to the left as aforestated.

The shaft 26a passes through a bearing sleeve 35 at the closed end 36 of case 11 and fixed thereto is a vertical arm 37 having a ball 38 at its lower end; the same mounted in a socket 39 in the upper end of a sleeve 40, the latter having free telescopic connection with the shifting fork stem 41 for the customary gear shifting rods (not shown) such as forms a part of the conventional selective type of transmission 10 herein referred to. The stem 41 is provided with longitudinal keyways 42 in which the fixed keys 43 in socket 39 are received, thus enabling the stem 41 to slide in the socket to compensate for vertical movement of the power plant relative to the body of the vehicle, as will be readily understood.

The case 11 of the aforementioned lever selector is bolted at B to a supporting platform P, the latter forming a fixed part of chassis C, and, as illustrated in Figure 1 of the drawings, the platform is positioned at an elevation to dispose the shaft 26 for operative alinement in the bearing bracket 44 on said chassis.

It follows from what has been stated that the shift lever 18 of the lever selector assembly herein disclosed can be mounted in the customary position in the driver's compartment at the front end of an automotive vehicle of which the invention is a part, and that it may be operated in exact accordance with the principle of operation of a "standard shift". This is so notwithstanding the fact that the selective type of transmission 10 herein disclosed is intended to move vertically with a power plant that is wholly suspended from the rear driven axle of the vehicle.

I shall broadly claim those features of the invention which enable the shifting rods of the transmission of a vertically movable power plant unit with which the transmission coacts to be actuated and their shifting movements accurately controlled by a selector mechanism at the front end of the vehicle, in which selector mechanism a lever is embodied and adapted to be manipulated the same as any well known standard shift, such, for instance, one of the H-plate type for effecting all of the usual speed changes.

I shall claim specifically all those features consisting mainly of the gear train including the gears 33 and 34 in which the gear 34 of the train is keyed to the slidable and oscillative gear shifting shaft 26a, about which gear 34 the gear 33 can turn in response to lateral motion manually imparted to the shift lever 18, whereby to effect (1) a selective turning of the shaft 26a either to the right or to the left, and (2) a selective motion forwards or backwards to be imparted to shaft 26a, according as may be necessary for a particular shifting of the change speed gears.

From the fact that the gears 33 and 34 are mounted to move longitudinally with shaft 26a and are in constant mesh with each other, the lever 18 can be accurately and smoothly controlled and all speed changes effected in an entirely reliable manner.

While I have suggested the use of a complete gear 35, it is to be clearly understood that a spur gear segment can be substituted therefor without departing from the spirit of the invention.

I reserve also the right to make those changes in the forms, proportions and arrangements of the parts employed that fall within the scope of the hereto appended claims.

I claim:

1. A lever selector for the transmission mechanism of a propeller shaft comprising constantly intermeshed gears by means of one of which the other gear can be driven; means supporting the gears to slide axially as a unit and for enabling said one gear to turn about the axis of the other to drive the latter; means for sliding the gears and for turning said one gear about the axis of said other gear; and means controlled through said other gear and by sliding both gears for actuating the speed change gears of a selective speed transmission.

2. A lever selector for the transmission mechanism of a propeller shaft comprising constantly intermeshed gears by means of one of which the other gear can be driven; means supporting the gears to slide axially as a unit and for enabling said one gear to turn about the axis of the other to drive the latter; manually actuable, universally tiltable means for sliding the gears and for turning said one gear about the axis of said other gear; and means controlled through said other gear and by sliding both gears for actuating the speed change gears of a selective speed transmission.

RICHARD THOMPSON.